United States Patent
Ji et al.

(10) Patent No.: US 9,185,668 B2
(45) Date of Patent: Nov. 10, 2015

(54) DYNAMIC TDD DATA CHANNEL TRANSMISSION METHOD AND APPARATUS FOR WIRELESS COMMUNICATION SYSTEM

(75) Inventors: Hyoungju Ji, Seoul (KR); Joonyoung Cho, Suwon-si (KR); Seunghoon Choi, Suwon-si (KR); Youngbum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 220 days.

(21) Appl. No.: 13/478,804

(22) Filed: May 23, 2012

(65) Prior Publication Data

US 2012/0300681 A1 Nov. 29, 2012

(30) Foreign Application Priority Data

May 23, 2011 (KR) .......................... 10-2011-0048303

(51) Int. Cl.
  *H04W 4/00* (2009.01)
  *H04W 56/00* (2009.01)
  *H04L 5/00* (2006.01)
  *H04L 5/14* (2006.01)

(52) U.S. Cl.
  CPC ............. *H04W 56/00* (2013.01); *H04L 5/0055* (2013.01); *H04L 5/1469* (2013.01)

(58) Field of Classification Search
  USPC ................. 370/276–296, 310–349, 431–468
  See application file for complete search history.

(56) References Cited

U.S. PATENT DOCUMENTS

| 7,953,050 | B2 * | 5/2011 | Li et al. ......................... | 370/336 |
| 8,559,343 | B2 * | 10/2013 | Parkvall et al. .............. | 370/280 |
| 2010/0009687 | A1 * | 1/2010 | Koivisto et al. .............. | 455/450 |
| 2010/0034135 | A1 * | 2/2010 | Kim et al. ...................... | 370/315 |
| 2010/0110964 | A1 * | 5/2010 | Love et al. .................... | 370/312 |
| 2011/0038299 | A1 * | 2/2011 | Sugawara et al. ............. | 370/312 |
| 2011/0149813 | A1 * | 6/2011 | Parkvall et al. ............... | 370/280 |
| 2011/0176461 | A1 * | 7/2011 | Astely et al. .................. | 370/280 |
| 2014/0056186 | A1 * | 2/2014 | Gao et al. ...................... | 370/280 |

FOREIGN PATENT DOCUMENTS

| EP | 2 429 097 | 3/2012 |
| WO | WO 2010/085187 | 7/2010 |
| WO | WO 2010/128790 | 11/2010 |
| WO | WO 2012149673 A1 * | 11/2012 |

OTHER PUBLICATIONS

NEC Group, "Cross-Carrier CFI Signalling,", R1-102258, 3GPP TSG-RAN WG1 Meeting #60bis, Apr. 12-16, 2010.

(Continued)

*Primary Examiner* — Kwang B Yao
*Assistant Examiner* — Juvena Loo
(74) *Attorney, Agent, or Firm* — The Farrell Law Firm, P.C.

(57) ABSTRACT

A data channel transmission method and apparatus is provided for the wireless communication system operating in a dynamic Time Division Duplex (TDD) mode. The dynamic TDD data channel transmission method and apparatus herein optimizes system performance in adaptation to the variation of the uplink and downlink traffic, and configures the radio frame such that all of the subframes have a static region, thereby operating along with other terminals without compromising channel estimation performance.

15 Claims, 11 Drawing Sheets

(56) References Cited

OTHER PUBLICATIONS

Huawei, HiSilicon, "Un PUCCH Design", R1-105256, 3GPP TSG RAN WG1 Meeting #62bis, Oct. 11-15, 2010.

Samsung, "Discussion on Backhaul Control Design for Type-I L3 Relay", 3GPP TSG RAN WG1 Meeting #57, R1-091871, May 4-8, 2009.

\* cited by examiner

DYNAMIC TDD DATA CHANNEL TRANSMISSION METHOD AND APPARATUS FOR WIRELESS COMMUNICATION SYSTEM

PRIORITY

This application claims priority under 35 U.S.C. §119(a) to Korean Patent Application No. 10-2011-0048303, which was filed in the Korean Intellectual Property Office on May 23, 2011, the contents of which are incorporated herein by reference.

BACKGROUND OF THE INVENTION

1. Field of the Invention

The present invention generally relates to a data channel transmission method and apparatus for a wireless communication system operating in a dynamic Time Division Duplex (TDD) mode.

2. Description of the Related Art

Orthogonal Frequency Division Multiplexing (OFDM) is a technique for transmitting data using multiple carriers, i.e. a multi-carrier transmission scheme, which converts a serial symbol stream to parallel symbol sets that are transmitted on the orthogonal multiple carriers.

The OFDM technique began in the late 1950's with the Frequency Division Multiplexing (FDM) for military communication purposes, and OFDM using orthogonal overlapping multiple subcarriers was later developed but initially was not widely used due to the difficulty of implementing orthogonal modulations between multiple carriers. However, with the introduction in 1971 of the use of a Discrete Fourier Transform (DFT) for implementation of the generation and reception of OFDM signals, by Weinstein, the OFDM technology has rapidly developed. Additionally, the introduction of a guard interval at the start of each symbol and use of cyclic prefix (CP) overcomes the negative effects caused by multipath signals and delay spread.

Due to these technical advances, the OFDM technology is now applied in various digital communications fields such as Digital Audio Broadcasting (DAB), Digital Video Broadcasting (DVB), Wireless Local Area Network (WLAN), and Wireless Asynchronous Transfer Mode (WATM), based on the introduction of various digital signal processing technologies such as Fast Fourier Transform (FFT) and Inverse Fast Fourier Transform (IFFT).

OFDM is similar to FDM but is much more spectrally efficient for achieving high-speed data transmission by orthogonally overlapping multiple subcarriers. Due to the spectral efficiency and robustness to the multipath fading, OFDM has been considered as a prominent solution for improved broadband data communication systems. Other advantages of OFDM are to control the Inter-Symbol Interference (ISI) using the guard interval and reduce the equalizer complexity in view of hardware as well as spectral efficiency and robustness to the frequency selective fading and multipath fading. OFDM is also robust to noise impulses and thus may be employed in various communication systems.

In OFDM, modulation signals are located in two-dimensional time-frequency resources, which are divided into different OFDM symbols and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is called a Resource Element (RE). Since different REs are orthogonal with each other, signals transmitted on different REs can be received without causing interference to each other.

A physical channel is defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver negotiate the RE on which a physical channel is transmitted, which is a process called mapping.

High-speed, high-quality wireless data services are generally hindered by the channel environment, which suffers from frequent changes due to additive white Gaussian noise (AWGN) and power variation of received signals, caused by such instances as a fading phenomenon, shadowing, a Doppler effect from terminal movement and a frequent change in terminal velocity, and interference by other users or multipath signals. Therefore, in order to support high-speed, high-quality wireless data services, there is a need to efficiently overcome the above channel quality degradation factors.

SUMMARY OF THE INVENTION

In order to solve the problems of the prior art, the present invention provides a method and apparatus for transmitting data in the wireless communication system operating in TDD mode that is capable of optimizing communication dynamically in adaptation to the uplink and downlink traffic variations by dividing a subframe into a semi-static region carrying the control channel and a dynamic region that can be used for uplink and/or downlink data channels according to the uplink and downlink data amount.

In accordance with an aspect of the present invention, a data transmission/reception method of a base station includes transmitting configuration information of a plurality of subframes divided at a time axis in a radio frame, dividing each of downlink subframes among the subframes into a semi-static region and a dynamic region, and transmitting a control signal in the semi-static region and receiving uplink data or transmitting downlink data in the dynamic region.

In accordance with an aspect of the present invention, a data transmission/reception method of a terminal includes receiving configuration information of a plurality of subframes divided at a time axis in a radio frame, discriminating between a semi-static region and a dynamic region of each of downlink subframes among the subframes, and receiving a control signal in the semi-static region and transmitting uplink data or receiving downlink data in the dynamic region.

In accordance with an aspect of the present invention, a data transmission/reception apparatus of a base station includes a controller which controls transmitting configuration information of a plurality of subframes divided at a time axis in a radio frame and dividing each of downlink subframes among the subframes into a semi-static region and a dynamic region, and a communication unit which transmits a control signal in the semi-static region and receives uplink data or transmits downlink data in the dynamic region under the control of the controller.

In accordance with an aspect of the present invention, a data transmission/reception apparatus of a terminal includes a controller which controls receiving a configuration information of a plurality of subframes divided at a time axis in a radio frame and discriminating between a semi-static region and a dynamic region of each of downlink subframes among the subframes, and a communication unit which receives a control signal in the semi-static region and transmits uplink data or receives downlink data in the dynamic region under the control of the controller.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. Detailed descriptions of well-known functions and structures incorporated herein may be omitted for the sake of clarity and conciseness.

Although the following description is directed to Long Term Evolution (LTE) and LTE-Advanced (LTE-A) systems, the present invention can be applied to other TDD-based radio communication systems operating with base station scheduling without addition or subtraction.

The LTE system is a representative system adopting OFDM in the downlink and Single Carrier-Frequency Division Multiple Access (SC-FDMA) in the uplink. An LTE system can be configured to operate in FDD mode in which one of two frequency bands is used for downlink transmission and the other for uplink or TDD mode in which one frequency band is time division duplexed into one channel for downlink transmission and the other for uplink transmission.

In TDD mode, the uplink and downlink are switched according to a rule, and the LTE defines total 7 TDD radio frame configurations among which one is selected and then maintained virtually the same. In TDD mode, if the cells are set with different configurations, they are likely to have failed transmission/reception due to inter-cell interference. Thus, all of the cells deployed within a certain area must be set with the same TDD configuration to acquire synchronization for uplink and downlink transmissions.

A subframe of the LTE system has a length of 1 ms in a time domain and the entire LTE transmission bandwidth in frequency domain and can be divided into two time slots. The LTE transmission bandwidth consists of a plurality of Resource Blocks (RBs), each of which being a basic unit of resource allocation. Each RB consists of 12 consecutive tones in the frequency domain and 14 consecutive OFDM symbols in the time domain. The subframe can include a control channel region for transmitting control channels and/or a data channel region for transmitting data channels. The control and/or data channel regions carry Reference Signals (RSs) for use in channel estimation.

Meanwhile, the control channel region for a legacy UE is arranged at the beginning of the subframe in the time domain. That is, the control channel region can be composed of L OFDM symbols at the beginning of the subframe, where L can be set to 1, 2, or 3. When using Multi-Media Broadcast over a Single Frequency Network (MBSFN) subframe for carrying broadcast information, L is 2. Regarding the MBSFN subframe, the UE can receive the control channel region of the corresponding subframe but not the data channel region.

Research has recently been focused on LTE-A, which has evolved from LTE. The LTE-A system operating in TDD mode cannot meet the variation of data traffic dynamically once the TDD radio frame configuration has been determined as described above. This is because the downlink subframe cannot be used for uplink transmission even when there is no downlink traffic while the uplink traffic increases. Extensive research is being conducted to solve this problem, which is likely to occur in the hierarchical cellular environment.

Figure 1:
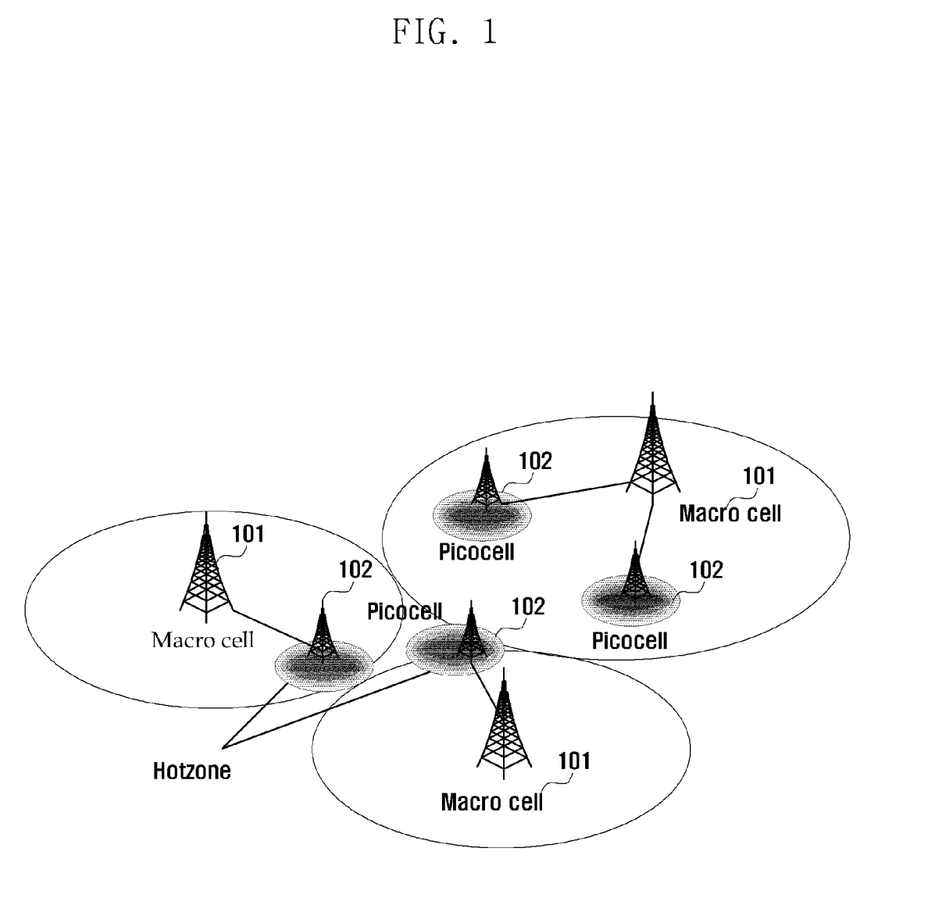
FIG. 1 illustrates a conceptual architecture of a wireless communication system to which the present invention is applied.

FIG. 1 illustrates a conceptual architecture of a wireless communication system to which the present invention is applied. As shown in FIG. 1, the macro cells and picocells are deployed hierarchically in the same area.

Referring to FIG. 1, reference number 101 denotes macrocells, and reference number 102 denotes picocells. Typically, the picocell operates at low transmit power as compared to the macrocell and is deployed at an area with high traffic density within the macrocell. The high traffic density area indicates a region where the data traffic to be processed varies in time.

For example, when a plurality of users receive downlink data and communicate through Voice over IP (VoIP), the UE is transmitting data in the uplink while receiving a large amount of data in the downlink. In this case, it is preferred for the system to configure the TDD radio frame with a relatively large number of subframes for downlink transmission while reducing the number of subframes for uplink transmission. With the conventional system configuration, however, it is difficult to meet the situation in which it is necessary to increase the uplink transmission resource for handling the abrupt increase of the data or VoIP signal to be transmitted in uplink.

Figure 2:
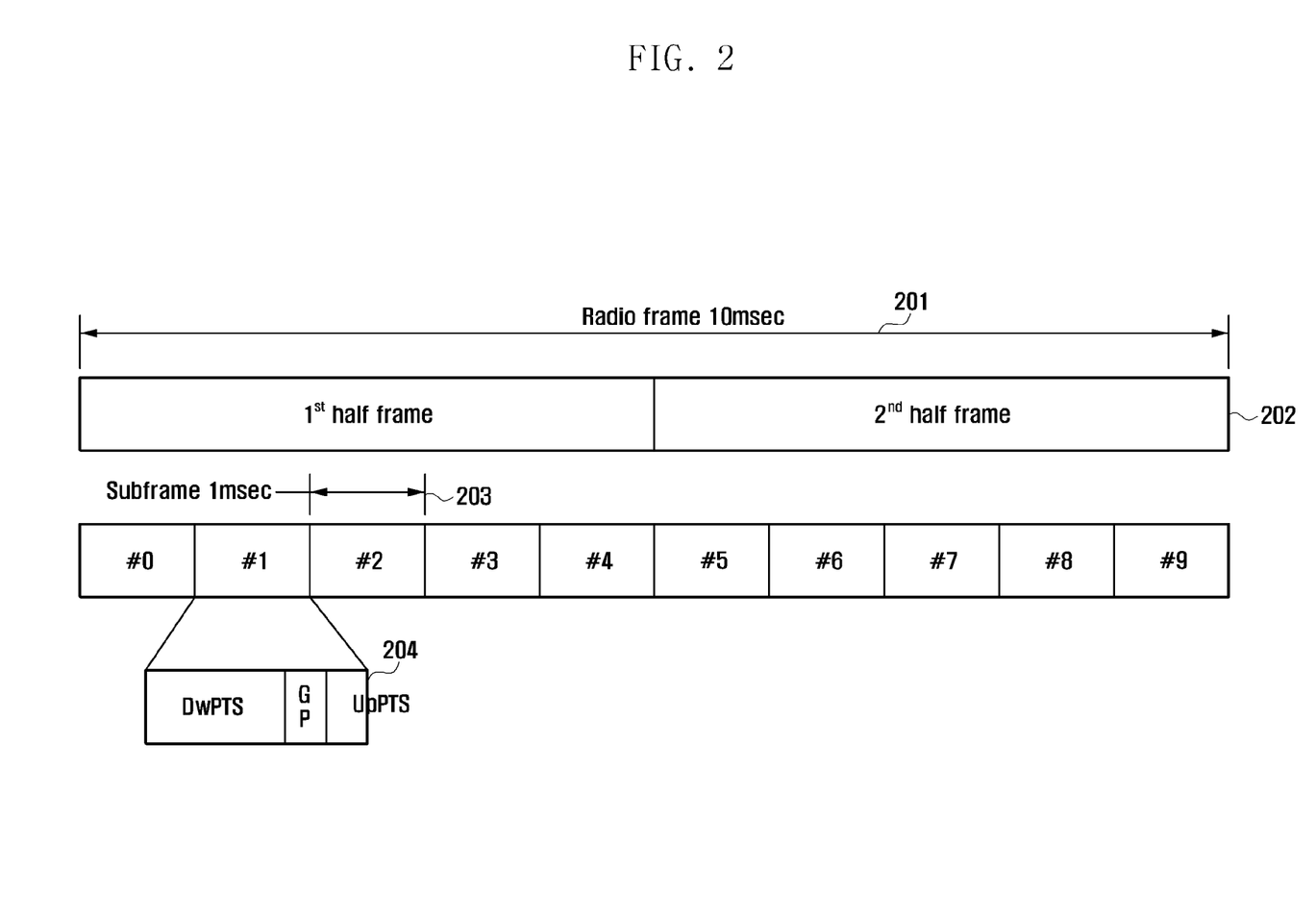
FIG. 2 illustrates the structure of a frame for use in a conventional TDD system.

FIG. 2 illustrates the structure of a frame for use in a conventional TDD system.

Referring to FIG. 2, a radio frame 201 spans 10 ms and consists of two half-radio frames 202. Each half-frame 202 consists of 5 subframes 203. The radio frame consists of 10 subframes, and each subframe has a length of 1 msec. The 10 subframes 203 can be set respectively according to one of a total 7 TDD configurations as shown in Table 1. In configuration 0 of Table 1, the $0^{th}$ and $5^{th}$ subframes are marked with "D" for indicating the downlink subframe, the $2^{nd}$, $3^{rd}$, $4^{th}$, $7^{th}$, and $8^{th}$ subframes are marked with "U" for indicating the uplink subframe, and $1^{st}$ and $6^{th}$ are marked with "S" for indicating a special subframe 204.

The special subframe 204 consists of a downlink part (DwPTS), a Guard Period (GP), and an uplink part (UpPTS). The DwPTS is for transmitting downlink control and data channel, the GP is not a carrier, and UpPTS is for transmitting an uplink signal. Since the special subframe 204 has a small uplink region, it is used for PRACH and SRS transmission but not as a data and control channel. The GP is configured to secure the time necessary for switching from downlink transmission to uplink reception.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to all of the TDD configuration information, there are subframes 203 configured for transmission in one direction fixedly regardless of the TDD configuration. The $0^{th}$, $1^{st}$, $5^{th}$, and $6^{th}$ subframes are maintained in transmission direction regardless of the TDD configuration. The remaining subframes can be changed in transmission direction according to the TDD configuration. In the MBSFN subframe, the $2^{nd}$, $3^{rd}$, $4^{th}$, $7^{th}$, $8^{th}$, and $9^{th}$ subframes can be used with the exception of the aforementioned $0^{th}$, $1^{st}$, $5^{th}$, and $6^{th}$ subframes since the excluded subframes are used to transmit a synchronization signal such as Physical Broadcast CHannel (PBCH), Primary Synchronization Signal (PSS), and Secondary Synchronization Signal (SSS).

Figure 3:
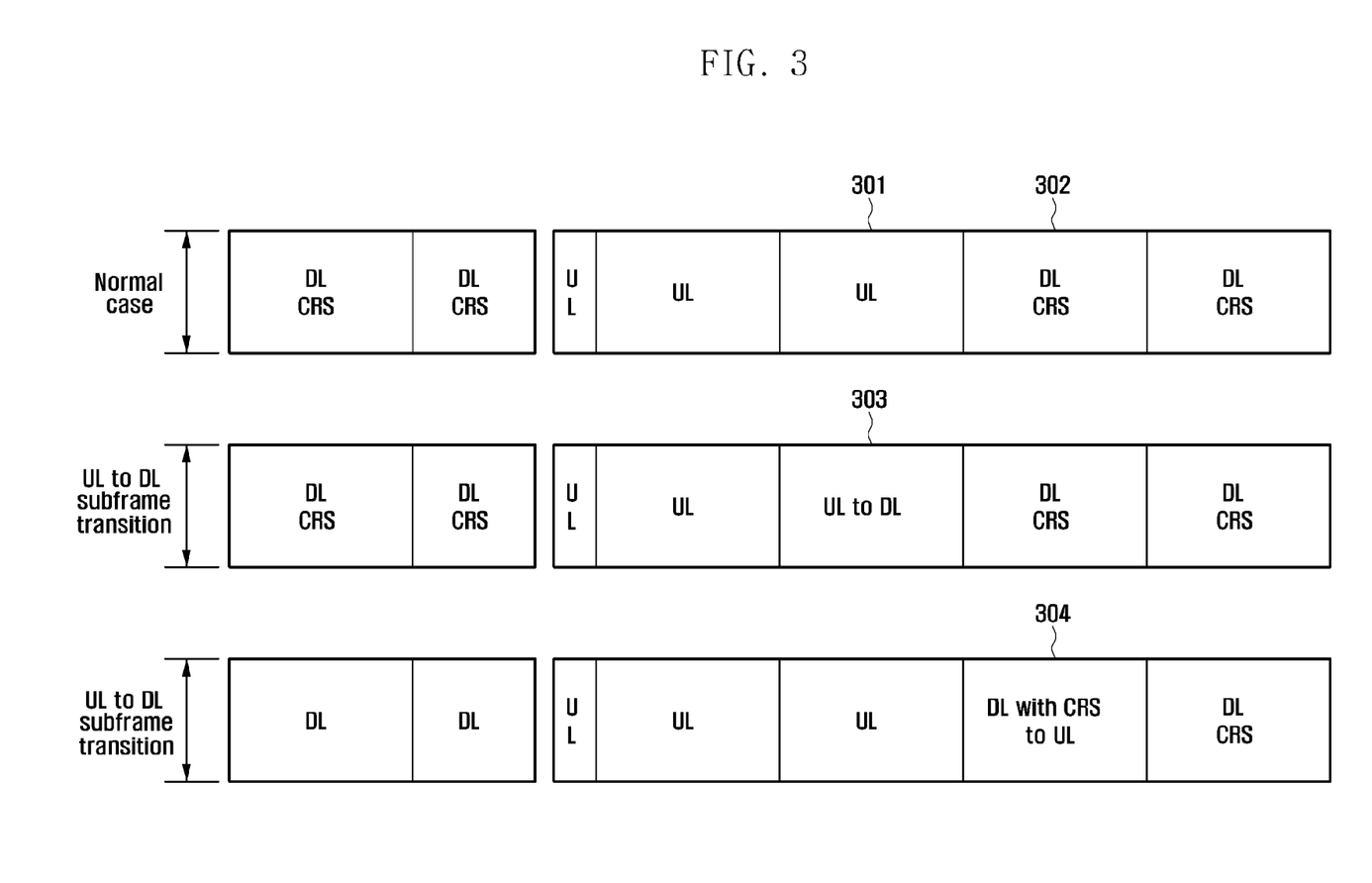
FIG. 3 illustrates a structure of the flexible subframe for use in the dynamic TDD data channel transmission method to which the present invention is applied.

FIG. 3 illustrates a structure of the flexible subframe for use in the dynamic TDD data channel transmission method to which the present invention is applied.

Referring to FIG. 3, once the TDD radio subframe is configured in the legacy LTE system, it is not changed by the data traffic amount. In the legacy LTE system, it takes more than 80 msec to change the configuration even though there is TDD interference from neighbor cells. In order to switch between uplink and downlink subframes dynamically, although a method for use of a certain uplink or downlink subframe may be used, these methods may cause significant system problems.

When switching from a certain uplink subframe 301 to a downlink subframe 303, following problems may take place. First, in the real communication environment, the switching occurs from downlink to uplink for processing a large amount of downlink traffic and sporadic uplink burst traffic. However, the switching from uplink to downlink is not appropriate for the real communication environment since it is necessary to configure a TDD radio frame having a large amount of uplink resource.

Second, the uplink subframe is associated with an uplink transmission process of the UE such that a specific downlink control channel is linked to the uplink subframe to transmit the control channel for the uplink data channel and an acknowledgement channel. Accordingly, if a certain uplink subframe disappears, the UE loses uplink data process and it is impossible to change a certain uplink subframe for a downlink subframe until the UE's uplink retransmission is completed. Accordingly, it is difficult to dynamically meet the traffic variation. Further, in order for the UE to check the subframe for use in the downlink, it is necessary to receive scheduling information such that when there is a false alarm in which the UE misinterprets scheduling information, this causes collision with the UE receiving a signal in the downlink, resulting in transmission/reception failure.

When using a certain downlink subframe 302 for uplink transmission as denoted by reference number 304, the following problems may occur. First, all of the UEs receive a channel using reference signals received on the downlink region carrying the common reference signals. Thus, if a certain downlink subframe is used for uplink transmission, all of the UEs in the cell may not estimate the reference signal accurately and may lose the link between the UE and the eNB.

Second, similar to when the uplink subframe is used as downlink subframe, the uplink subframe is associated with an uplink transmission process of the UE such that a specific downlink control channel is linked to the uplink subframe to transmit the control channel for the uplink data channel and an acknowledgement channel. Accordingly, if a certain downlink subframe disappears, the UE loses the uplink data process such that, until the UE's uplink retransmission ends completely, a certain uplink subframe for a downlink subframe cannot be changed.

There is therefore a need of a method for switching between the uplink and downlink in adaptation to the traffic variation without compromising the UE's reference signal measurement as well as the UE's transmission/reception process.

Figure 4:
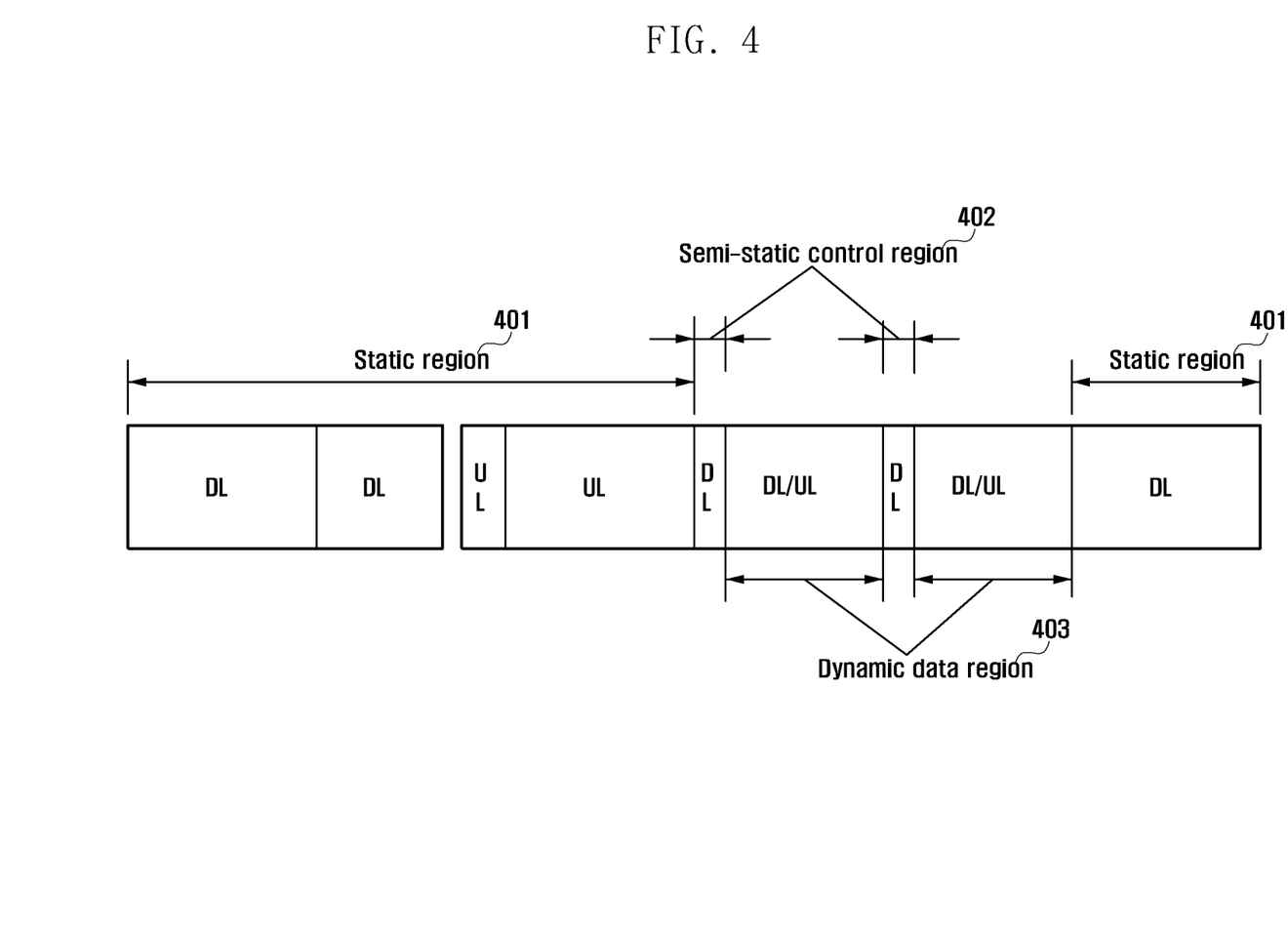
FIG. 4 illustrates a structure of an adaptive TDD radio frame for used in the dynamic TDD data channel to an embodiment of the present invention.

FIG. 4 illustrates a structure of an adaptive TDD radio frame for use in the dynamic TDD data channel according to an embodiment of the present invention.

Referring to FIG. 4, the system checks the static region 401 by referencing the TDD radio frame configuration information and determines the proposed dynamic data region by referencing the MBSFN subframe configuration information. In this case, the $2^{nd}$, $3^{rd}$, $4^{th}$, $7^{th}$, $8^{th}$, and $9^{th}$ subframes are candidate subframes that can be configured, when used for downlink transmission, as flexible subframes for dynamic data transmission. The candidate subframes can appear contiguously or discretely. The system transmits the information on the dynamic data channel actually available for the dynamic data transmission among the candidate subframes, and the UE uses the corresponding region for dynamic data transmission.

If there is no dynamic data channel information, all of the MBSFN subframes can be used as dynamic data channel with the notification on whether the dynamic data channel is used in the system information. The dynamic data channel information includes the transmission/reception timing information on the control channel and acknowledgement channel for the uplink and downlink processes related to the dynamic data channel, and this information can be retained by the UE rather than signaled by the system. The candidate subframe for dynamic transmission is divided into a semi-static control region 402 and a dynamic data region 403. The semi-static control region is for transmitting control channel from the eNB to the UE and can be changed semi-statically based on the MBSFN configuration information and dynamic data channel information.

The dynamic data region 403 is for transmitting actual data and can be used as a downlink data channel for transmitting a large amount of downlink traffic or an uplink data channel for transmitting increased uplink data transmission according to the traffic variation in the cell. Whether to configure the dynamic data region 403 for downlink transmission is determined depending on the existence of the downlink control channel received in the semi-static region of the same MBSFN subframe. When transmitting the downlink control channel for the UE in the semi-static control region 402, the eNB transmits the data channel scheduled in the corresponding region.

Since the corresponding region is the MBSFN subframe and carries a common reference signal, the data channel is transmitted using DMRS. In order to use the dynamic data region for uplink transmission, the eNB transmits uplink scheduling received in a certain linked downlink control channel region. Upon receipt of the uplink scheduling in the linked downlink control channel region, the linked dynamic data region 402 is used for uplink transmission, and the eNB stops transmission to receive the signal from the UE. This frame structure overcomes the shortcoming of the method described with reference to FIG. 3.

Figure 5:
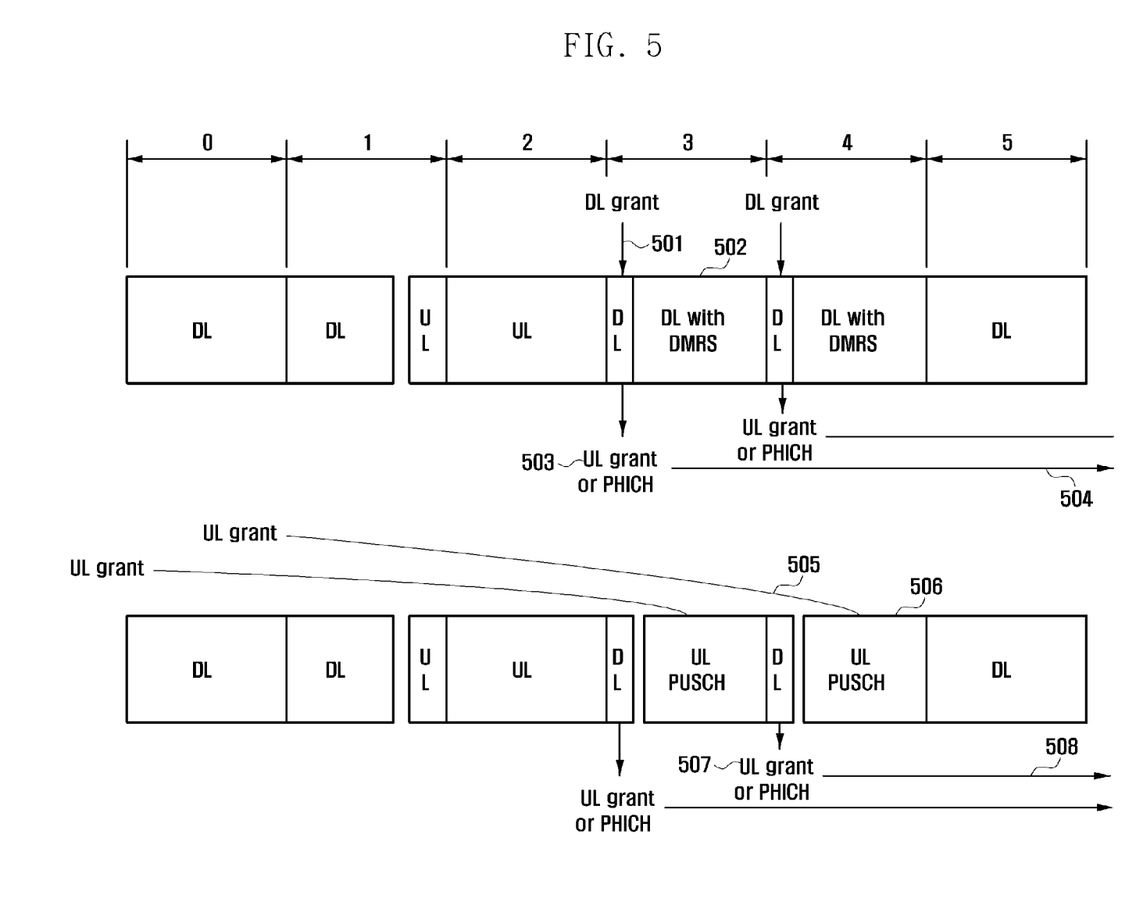
FIG. 5 illustrates the transmission-reception relationship of the dynamic TDD data channel of the dynamic TDD data channel transmission method according to an embodiment of the present invention.

FIG. 5 illustrates the transmission-reception relationship of the dynamic TDD data channel of the dynamic TDD data channel transmission method according to an embodiment of the present invention. FIG. 5 illustrates how to overcome the shortcoming of the scheduling and reference signal measurement using the semi-static control region and dynamic data region disclosed in the present invention.

FIG. 5 relates to a technique for guaranteeing control channel transmission of the eNB regardless of the change in data region. The semi-static region 501 and 503 can be used for transmitting uplink scheduling information, downlink scheduling information, and an acknowledgement channel. Since the acknowledgement channel 503 and 507 corresponding to the uplink transmission linked to the corresponding dynamic data channel can always be transmitted regardless of the downlink transmission 502 of the dynamic data channel and the uplink grant 506, it is possible to use the dynamic data region even when the UE's transmission process is terminated.

Since MBSFN is available only in the downlink and the disclosed technique is for using the downlink resource for uplink transmission, it can be applied to the system having a downlink-dominant traffic pattern with sporadic uplink burst traffic. Since the MBSFN subframe carries the common reference signal only in the control channel with a blank data region, it is not used for common reference signal-based channel estimation such that, even though the corresponding region is used for uplink transmission, it does not influence the reference signal measurement. Thus, the UE's reception performance is not affected.

Although it is assumed that the UE has received the uplink scheduling control channel 505, the eNB can transmit the downlink control channel again in the control channel region 501 regardless of a false alarm so as to reduce the false alarm probability. If it is assumed that the false alarm occurs at a probability of p (p<0) as usual, the false alarm probability becomes p*p when using the disclosed method, thereby overcoming the false alarm problem.

Figure 6:
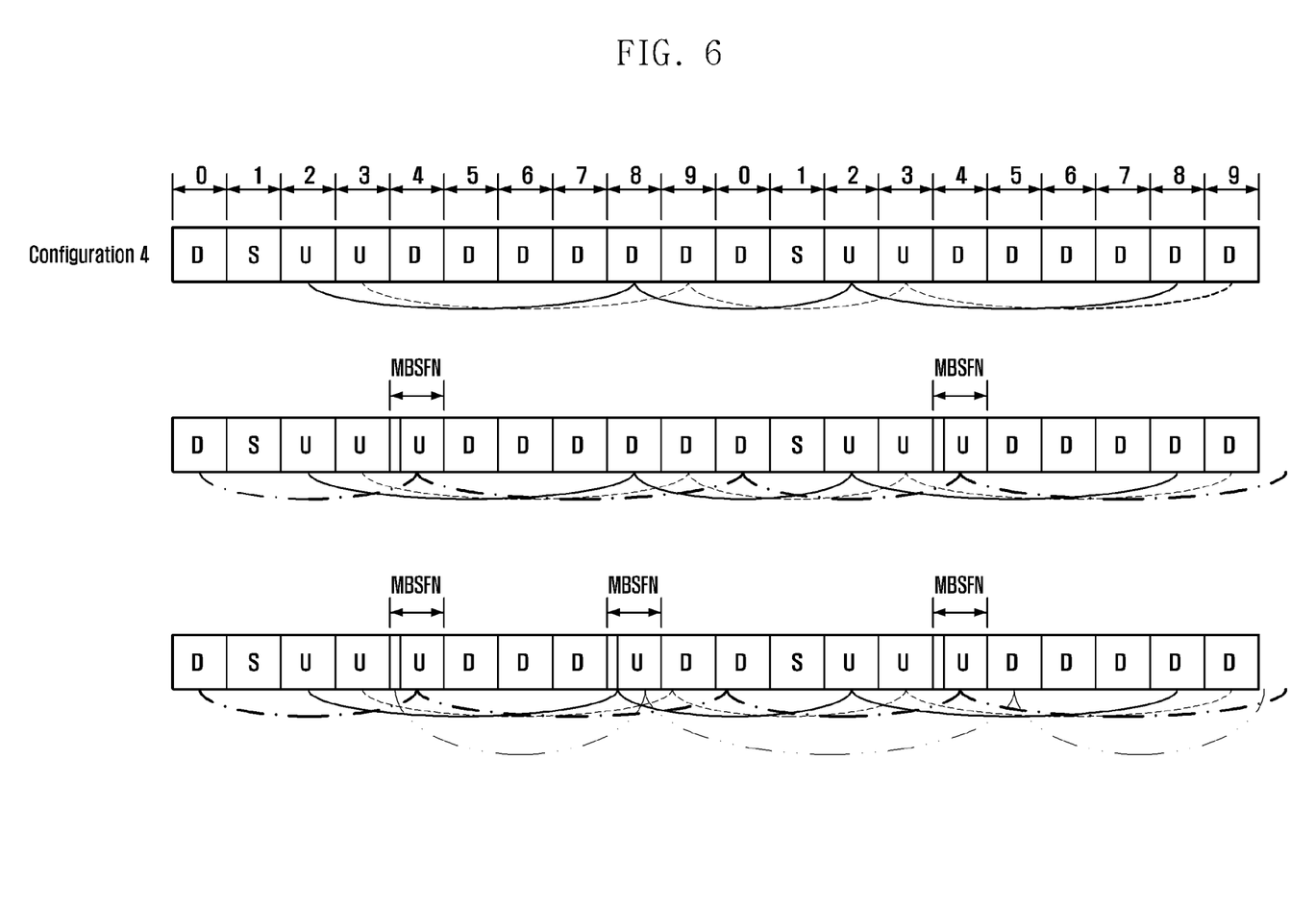
FIG. 6 illustrates relationship among control, acknowledgement, and data channels when the dynamic subframe is used for uplink transmission according to an embodiment of the present invention.

FIG. 6 illustrates relationship among control, acknowledgement, and data channels when the dynamic subframe is used for uplink transmission according to an embodiment of the present invention.

Referring to FIG. 6, when the system instructs one TDD radio frame configuration to all of the UEs, the UEs transmit and receive the data can controls channels at transmission/reception timings. This is applied to both the uplink and downlink data transmission. For example, if the system is configured with the configuration 4 601, the UEs can have up to 2 uplink data processes based on the timings 602 and 603. If it is required to instantly allocate further uplink resources, the eNB can use a certain downlink resource that can be configured for MBSFN based on two methods.

One method is to configure the subframes chanted by applying a flexible subframe as shown in Table 1, and the other method is to configure the subframes according to a configuration not shown in Table 1. When using the configurations shown in Table 1, e.g. the fourth subframe 604 is used, the configuration is identical with the TDD radio frame configuration 4 in Table 1 from the reference point of the timing available for entire uplink transmission. In this case, since the UE knows the transmission-reception configuration of the channels as shown in Table 1, it recognizes that other configurations in Table 1 can be applied such that the UE can use the transmission/reception timing of configuration 4 of Table 1.

If the dynamic subframe is applied to change the configuration for another configuration of Table 1, it can be possible to change only the process linked to the changed uplink subframe, and the other method can be of changing the process linked to the uplink subframe for a new configuration. It is also possible to add a 1-bit field to the control channel to indicate the configuration among normal the TDD radio frame structure or a temporarily applied TDD radio frame configuration.

The configuration with change of the dynamic subframe may not be included in Table 1, such as when the ninth subframe 606 is used as the dynamic subframe. In this case, a rule is applied such that the control channel is transmitted at the subframe appearing first after four subframes since the dynamic subframe in the downlink control channel appears first before 4 dynamic subframes in consideration of the receipt of the control channel.

Figure 7:
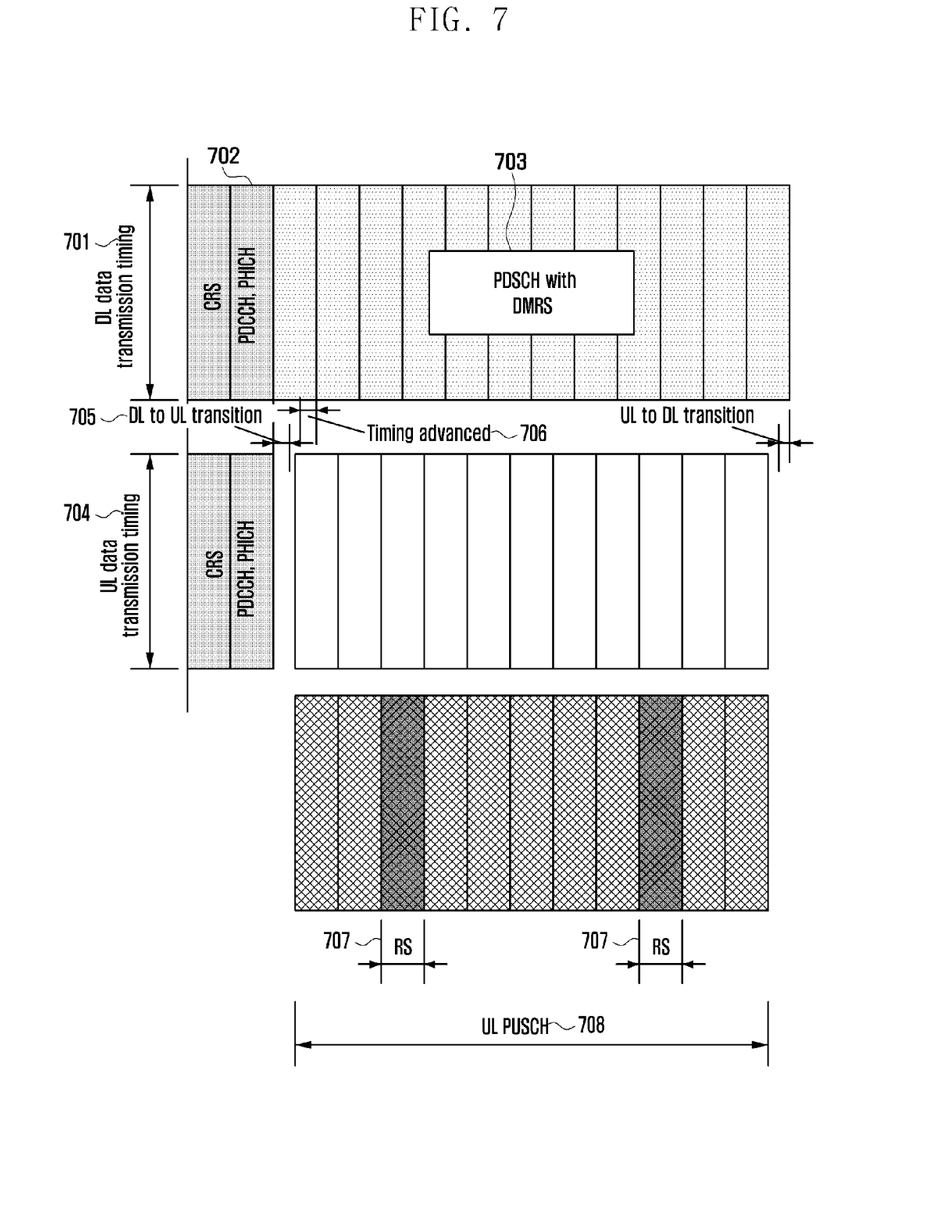
FIG. 7 illustrates a structure of a subframe configured for actual data transmission in the dynamic data region in the dynamic TDD data transmission method according to an embodiment of the present invention.

FIG. 7 illustrates a structure of a subframe configured for actual data transmission in the dynamic data region in the dynamic TDD data transmission method according to an embodiment of the present invention.

Referring to FIG. 7, reference numeral 701 denotes the timing at which the dynamic data region is used for downlink transmission. Reference numeral 702 denotes the semi-static region for transmitting a control channel with the common reference signal. Reference numeral 703 denotes the region that is originally blank or carries a broadcast channel and, in the present invention, used for downlink data channel transmission with the Dedicated Modulation Reference Signal (DM-RS). Reference numeral 704 denotes the timing at which the dynamic data channel is used for uplink data channel transmission.

Even at the uplink data transmission timing, the first one or two symbols are used for downlink transmission as denoted by the reference numeral 702, and this region is used for the UE to transmit the control channel using the common reference signal. Afterward, in order to switch to the uplink, the eNB stops transmission and the UE transmits the signal as denoted by reference numeral 708 in consideration of the UE's link switching timing 705 and the eNB's reception synchronization timing 706. When the first two symbols are used for control channel transmission, a total 11 symbols can be used for uplink data channel as denoted by reference numeral 708 and, for this purpose, it is necessary to change the position of the reference signal.

The present invention discloses a subframe structure in which the $5^{th}$ and $11^{th}$ symbols are used for the reference signal with a total 11 symbols for data transmission. In this case, the number of available symbols in the dynamic data region is 11 and is used at the uplink channel interleaver. This is identical to when the Sounding Reference Signal (SRS) is transmitted in the subframe with an extended Cyclic Prefix (CP), and the column set of the channel interleaver for rank information is {0, 3, 5, 8}. The column set for Hybrid Automatic Repeat ReQuest ACKnowledgement (HARQ-ACK is {1, 2, 6, 7} and, in this case, the structure is identical with the case of transmission SRS in the subframe with extended CP. When the dynamic data channel is used as the uplink data channel, the UE's acknowledgement channel is not transmitted and, since the entire band is used for the data channel so as to compensate for the loss of the downlink control channel in a few symbols at the beginning, the system performance is not degraded.

Figure 8:
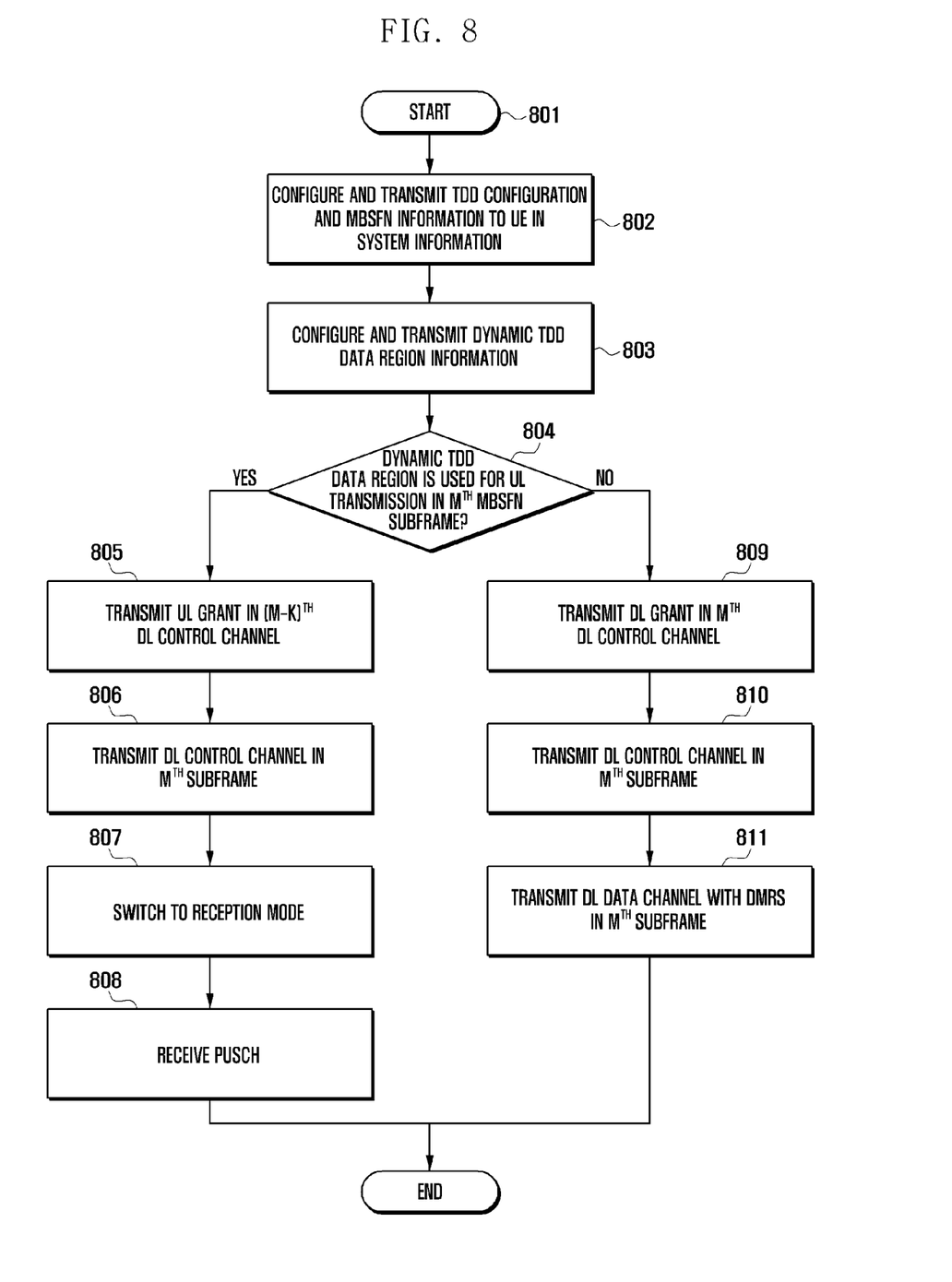
FIG. 8 illustrates an eNB procedure of the dynamic TDD data channel transmission method according to an embodiment of the present invention.

FIG. 8 illustrates an eNB procedure of the dynamic TDD data channel transmission method according to an embodiment of the present invention.

Referring to FIG. 8, the eNB transmits the system information including the TDD radio frame configuration information and the cell's MBSFN subframe configuration information to the UE at step 802. Next, the eNB generates a dynamic TDD data region information for use of the dynamic data channel in the MBSFN subframe and transmits the data region information to the UE through higher layer signaling at step 803. The eNB determines whether the dynamic data region of the $m^{th}$ subframe as MBSFN subframe is used for uplink transmission at step 804.

If it is determined that the dynamic data region of the $m^{th}$ subframe is used for uplink transmission at step 804, the eNB transmits uplink scheduling control channel at the control channel region of the $(m-k)^{th}$ subframe at step 805. Here, k denotes the time interval defined according to the configurations listed in Table 1, and any case which is not included in Table 1 indicates the subframe of which index (m−k) is greater than 4 and which is a downlink subframe. Accordingly, the eNB transmits the control channel at the $m^{th}$ subframe at step 806 and then switches to the reception mode at step 807. At this time, the eNB can transmit the channel allocation information for the data channel of the $m^{th}$ subframe, and the channel allocation information for the data channel of the uplink subframe linked to the $m^{th}$ subframe. Next, the eNB receives the UE's Physical Uplink Shared Channel (PUSCH) data channel in the shortened format based on the scheduling result at step 808. At this time, the eNB can receive the data channel using the uplink reference signal in the $5^{th}$ and $11^{th}$ symbols among $0^{th}$ to $11^{th}$ symbols of $m^{th}$ subframe.

Otherwise, if it is determined that the dynamic data region of $m^{th}$ subframe is used for downlink transmission at step 804, the eNB transmits downlink scheduling information at the control channel region of $m^{th}$ subframe at step 809. Next, the eNB transmits the control channel in the $m^{th}$ subframe at step 810. At this time, the eNB can transmit the channel allocation information for the data channel in the $m^{th}$ subframe. Afterward, the eNB transmits the data channel UE-specific reference signal at step 811. The UE specific reference signal is a Dedicated Modulation Reference Signal (DMRS).

That is, the eNB divides an MBSFN subframe into a semi-static region and a dynamic region among a plurality of subframes multiplexed in a radio frame temporally. The eNB transmits a control signal in the semi-static region and receives uplink data or transmits downlink data in the dynamic region. At this time, the eNB can receive the uplink data or transmit the downlink data in the dynamic region according to the control signal in the semi-static region. The eNB also can receive the uplink data or transmit the downlink data in the dynamic region of the MBSFN subframe according to the control signal of the static subframe linked with the MBSFN subframe among the subframes. The eNB can also receive the uplink data in the static uplink subframe linked with the MBSFN subframe among the subframes according to the control signal in the semi-static region.

Figure 9:
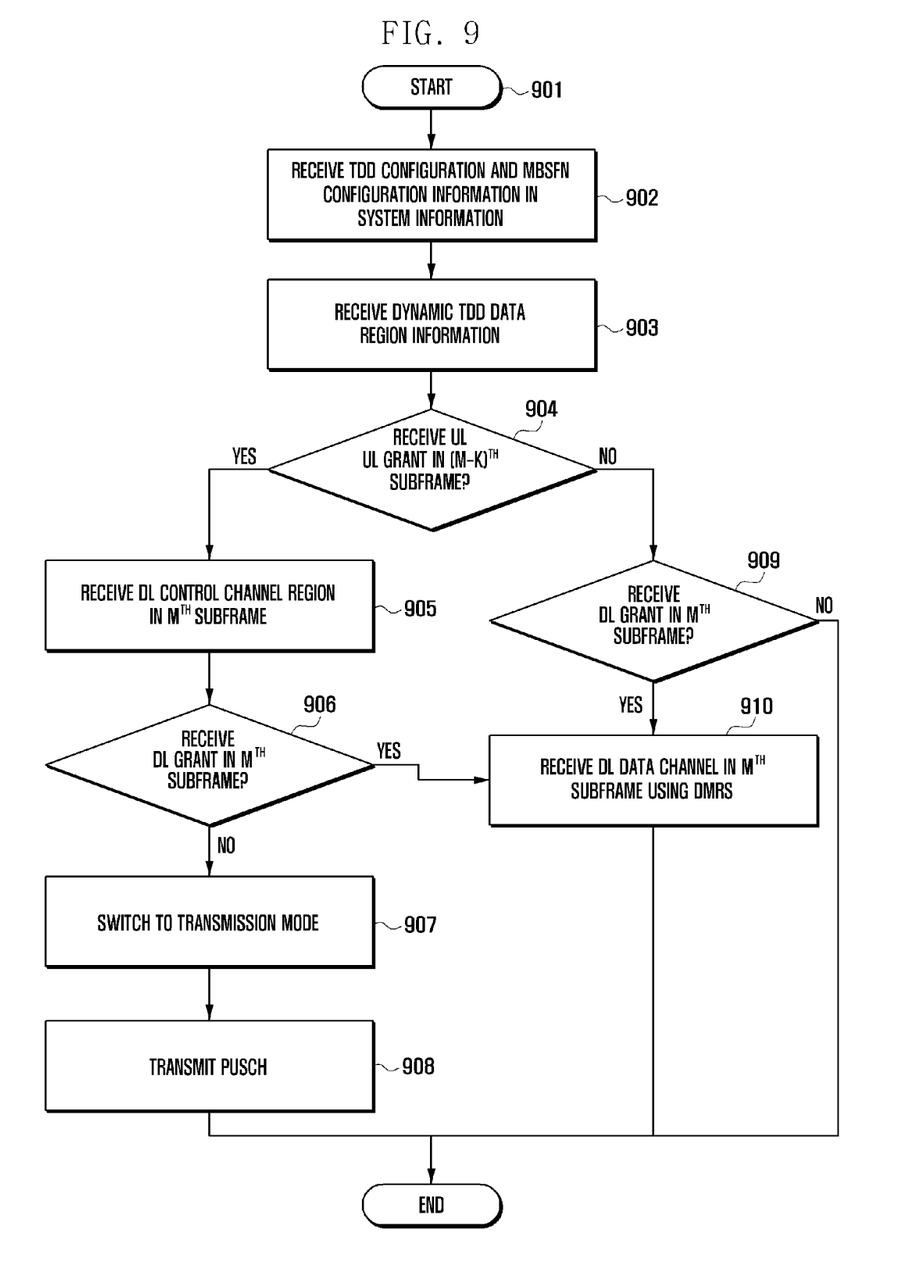
FIG. 9 illustrates a UE procedure of the dynamic TDD data channel transmission method according to an embodiment of the present invention.

FIG. 9 illustrates a UE procedure of the dynamic TDD data channel transmission method according to an embodiment of the present invention.

Referring to FIG. 9, the UE acquires the TDD radio frame configuration information and the MBSFN configuration information in the system information transmitted by the eNB at step 902. Next, the UE receives the dynamic TDD data region configuration information at step 903. If the uplink scheduling control channel is received successfully in the $(m-k)^{th}$ subframe at step 904, the UE receives the control channel in the $m^{th}$ subframe at step 905. If the downlink control channel is received successfully in the mth subframe at step 906, the UE receives data in the dynamic data channel using the DMRS at step 910.

Otherwise, if the downlink scheduling control channel is not received at step 906, the UE switches to the transmission mode at step 907 and transmits the Physical Uplink Shared Channel (PUSCH) data channel in shortened format at step 908.

If the uplink control channel is not received in $(m-k)^{th}$ subframe at step 904 and if the downlink control channel is received successfully in the $m^{th}$ subframe at step 909, the UE receives the downlink data channel at step 910. Otherwise, if it fails to receive the downlink control channel in the mth subframe at step 909, the UE terminates reception session without receipt of any data.

That is, the UE checks the semi-static region and the dynamic region of the MBSFN subframes among a plurality of subframes multiplexed temporally in a radio frame. The UE receives the control signal in the semi-static region and transmits uplink data or receives downlink data in the dynamic region. At this time, the UE can transmit the uplink data or receive the downlink data in the dynamic region according to the control signal received in the semi-static region. The UE also can transmit the uplink data or receive the downlink data in the dynamic region of the MBSFN subframe according to the control signal carried in a static subframe linked to the MBSFN subframe among the subframes. The UE also can transmit the uplink data in the static uplink subframe linked to the MBSFN subframe among the subframes according to the control signal received in the semi-static region.

Figure 10:
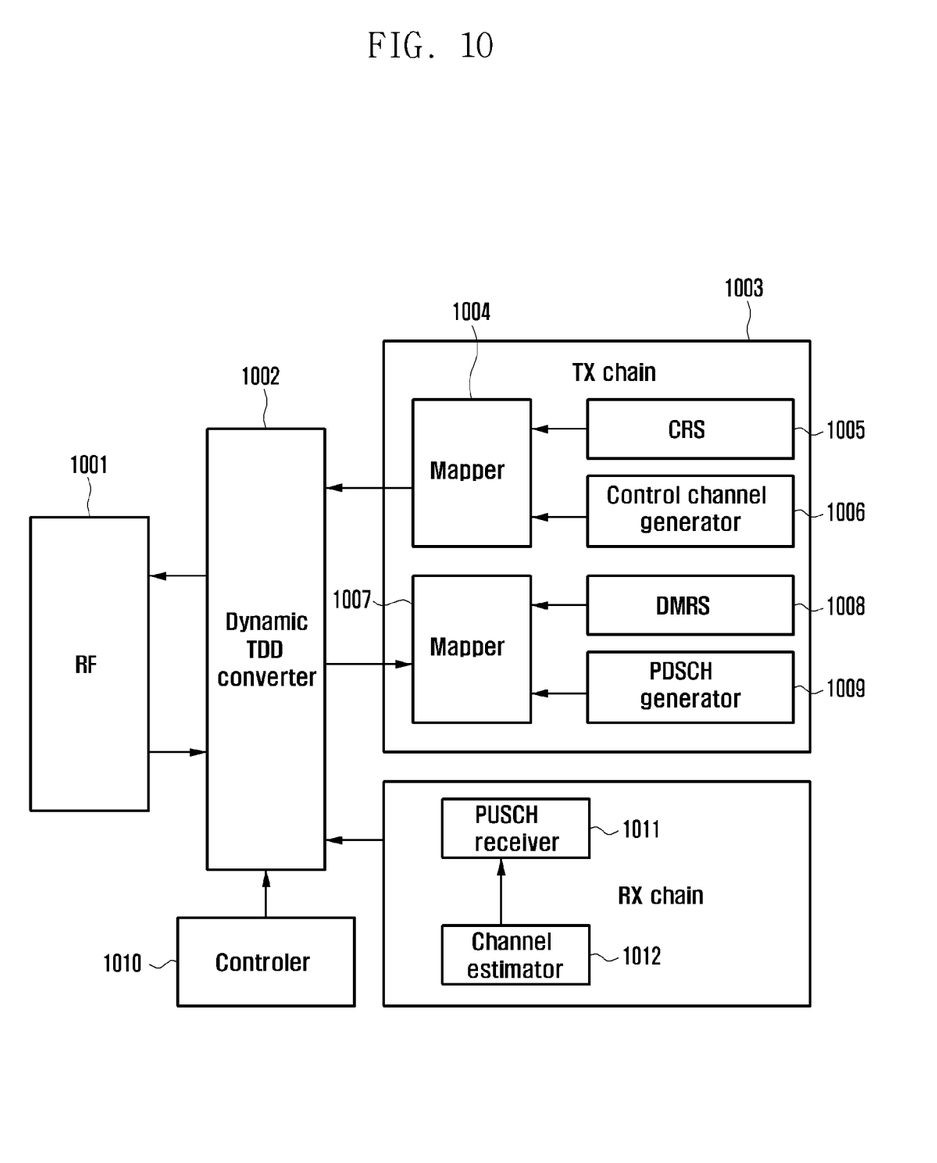
FIG. 10 illustrates a configuration of the eNB according to an embodiment of the present invention.

FIG. 10 illustrates a configuration of the eNB according to an embodiment of the present invention.

Referring to FIG. 10, the eNB includes a Time Division Duplex Radio Frequency (TDD RF) unit 1001, a dynamic TDD converter 1002, a CRS generator 1005, a control channel generator 1006, a Dedicated Modulation Reference Signal (DMRS) generator 1008, a data channel generator 1009, mappers 1004 and 1007, an uplink data receiver 1011, a channel estimator 1012, and a controller 1010.

The TDD RF unit 1001 is responsible for transmitting and receiving signal in time-divided manner. The dynamic TDD converter 1002 determines when the TDD RF unit 1001 is used for downlink transmission and uplink reception under the control of the controller 1010. The Cell-specific Reference Signal (CRS) generator 1005 and the control channel generator 1006 configure a control channel, and the DMRS generator 1008 and the data channel generator 1009 configure a downlink data channel. The mappers 1004 and 1007 map the control and data channels in to the subframe.

The channel estimator 1012 estimates uplink data channel according to the uplink reference signal, and the uplink data receiver 1011 receives uplink data. That is, when the eNB is configured to transmit the control channel in the semi-static region and the downlink data in the dynamic region according to the present invention, the dynamic TDD converter 1002 transmits the control channel and downlink data. If the dynamic data channel is used for uplink transmission, the dynamic TDD converter 1002 receives the uplink data.

The controller 1010 discriminates between the semi-static region and the dynamic region of the MBSFN subframes in each radio frame. The controller 1010 then transmits the control signal in the semi-static region and receives the uplink data or transmits the downlink data in the dynamic region. The controller 1010 can control to transmit the downlink data in the dynamic region with DMRS. The controller 101 also can control to receive the uplink data using the uplink reference signals carried in the $5^{th}$ and $11^{th}$ symbols among the $0^{th}$ to $11^{th}$ symbols in the dynamic region.

The control signal can be included in the channel allocation information for uplink or downlink data in the dynamic region. The control signal also can be included in the channel allocation information for uplink data of the uplink subframe as static region linked to the MBSFN subframe among the subframes. The channel allocation information in the dynamic region can be transmitted through the control signal of another subframe as a static region linked to the MBSFN subframe among the subframes.

Figure 11:
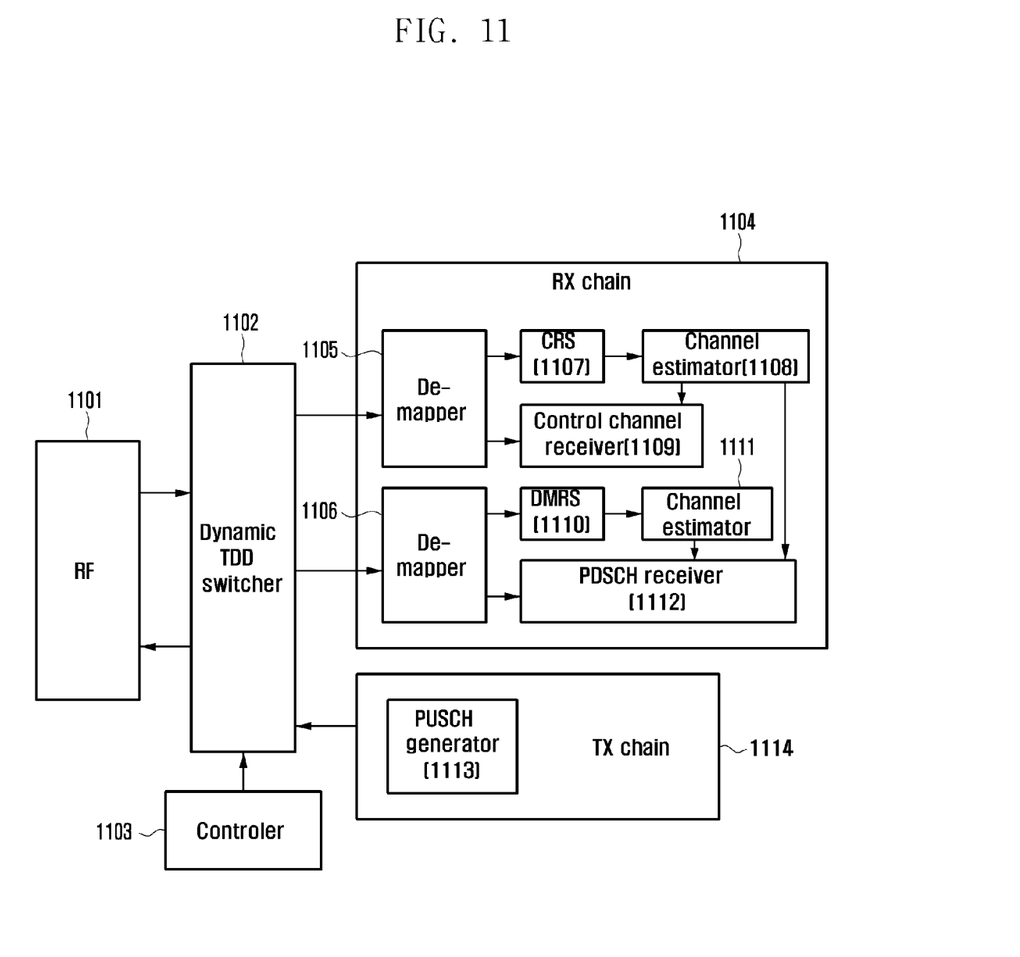
FIG. 11 illustrates a configuration of the UE according to an embodiment of the present invention.

FIG. 11 illustrates a configuration of the UE according to an embodiment of the present invention.

Referring to FIG. 11, the UE includes an RF unit 1101, a dynamic TDD converter 1102, demappers 1105 and 1106, a CRS receiver 1107, a channel estimator 1108, a control channel receiver 1109, a DMRS receiver 1110, a channel estimator 1111, a Physical Downlink Shared Channel (PDSCH) data channel receiver 1112, a data channel generator 1113, and a controller 1103.

The RF unit 1101 is configured as a single device responsible for both the signal transmission and reception. The dynamic TDD converter 1102 determines the timings of uplink transmission and downlink reception of the RF unit 1101 under the control of the controller 1103. The demappers 1105 and 1106 receive the control channel and the downlink data channel. The CRS receiver 1107 receives the common reference signal, the channel estimator 1108 estimates control channel using the common reference signal, and the control channel receiver 1109 receives the control channel.

The DMRS receiver 1110 receives the common reference signal, the channel estimator 1111 estimates the downlink data channel using the common reference signal, and the data channel receiver 1112 receives the downlink data channel. The data channel generator 1113 generates the uplink data channel. That is, when the dynamic data region is used for downlink transmission, the UE switches to the reception mode to receive the control channel transmitted by the eNB. The UE receives the downlink data channel transmitted by the eNB. When the dynamic data region is used for uplink transmission, the UE generates uplink data channel through the transmission chain 1114 and transmits the uplink data channel to the eNB.

The controller 1103 discriminates between the semi-static region and the dynamic region of the MBSFN subframe in the radio frame. The controller 1103 controls to receive the control signal in the semi-static region and transmit the uplink data or receive the downlink data in the dynamic region. The controller 1103 can control to estimate the channel using the DMRS received in the dynamic region to receive the downlink data.

The controller 1103 can control to transmit the uplink data with the uplink reference signals of the $5^{th}$ and $11^{th}$ symbols among the $0^{th}$ to $11^{th}$ symbols in the dynamic region. The control signal can include the channel allocation information for uplink data or downlink data in the dynamic region. The control signal can include the channel information for the uplink data of the uplink subframe as static subframe linked to the MBSFN subframe among the subframes. The channel allocation information of the dynamic region can be transmitted through the control information of other subframe as the static region linked to the MBSFN subframe among the subframes.

As described above, the dynamic TDD data channel transmission method and apparatus of the present invention enables the eNB to switch the resource between uplink and downlink in the dynamic data region in adaptation to the variation of data traffic without compromising channel estimation accuracy. Also, the dynamic TDD data channel transmission method and apparatus of the present invention is capable of minimizing resource waste, at the UE, caused by changing the resource in the semi-static region.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A data transmission/reception method of a base station, comprising:
  transmitting configuration information of a plurality of subframes divided at a time axis in a radio frame;
  dividing each of downlink subframes among the plurality of subframes into a semi-static region and a dynamic region;
  transmitting a control signal in the semi-static region;
  transmitting downlink data in the dynamic region, if the control signal comprises information indicating the dynamic region is for downlink data transmission and
  receiving uplink data in the dynamic region, if the control signal comprises information indicating the dynamic region is for uplink data transmission.

2. The data transmission/reception method of claim 1, wherein transmitting the control signal in the semi-static region and receiving uplink data in the dynamic region comprises:
  configuring each of the divided downlink subframes as a Multi-Media Broadcast over a Single Frequency Network (MBSFN) subframe; and
  transmitting the configuration information.

3. The data transmission/reception method of claim 1, wherein transmitting the control signal in the semi-static region and receiving uplink data in the dynamic region comprises receiving the uplink data by referencing an uplink reference signal at $5^{th}$ and $11^{th}$ symbols in the dynamic region.

4. The data transmission/reception method of claim 1, wherein the control signal comprises channel allocation information for uplink or downlink data in the dynamic region or channel allocation information for uplink data in an uplink subframe linked to the downlink subframe among the plurality of subframes.

5. A data transmission/reception method of a terminal, comprising:
- receiving configuration information of a plurality of subframes divided at time axis in a radio frame;
- discriminating between a semi-static region and a dynamic region of each of downlink subframes among the plurality of subframes;
- receiving a control signal in the semi-static region;
- transmitting uplink data in the dynamic region, if the control signal comprises information indicating the dynamic region is for uplink data transmission; and
- receiving downlink data in the dynamic region, if the control signal comprises information indicating the dynamic region is for downlink data transmission.

6. The data transmission/reception method of claim 5, wherein receiving the control signal in the semi-static region and transmitting uplink data in the dynamic region comprises transmitting the uplink data by referencing an uplink reference signal at $5^{th}$ and $11^{th}$ symbols in the dynamic region.

7. The data transmission/reception method of claim 5, wherein receiving the control signal in the semi-static region and transmitting uplink data in the dynamic region comprises receiving information on the downlink subframe configured as a Multi-Media Broadcast over a Single Frequency Network (MBSFN) subframe.

8. The data transmission/reception method of claim 5, wherein the control signal comprises channel allocation information for uplink or downlink data in the dynamic region or channel allocation information for uplink data in an uplink subframe linked to the downlink subframe among the plurality of subframes.

9. A data transmission/reception apparatus of a base station, comprising:
- a communication unit for receiving and transmitting a signal; and
- a controller configured to transmit configuration information of a plurality of subframes divided at a time axis in a radio frame, to divide each of downlink subframes among the plurality of subframes into a semi-static region and a dynamic region, transmit a control signal in the semi-static region, transmit downlink data in the dynamic region, if the control signal comprises information indicating the dynamic region is for downlink data transmission, and receive uplink data in the dynamic region, if the control signal comprises information indicating the dynamic region is for uplink data transmission.

10. The data transmission/reception apparatus of claim 9, wherein the controller controls configuring each of the downlink subframe as a Multi-Media Broadcast over a Single Frequency Network (MBSFN) subframe and transmitting configuration information.

11. The data transmission/reception apparatus of claim 9, wherein the control signal comprises channel allocation information for uplink or downlink data in the dynamic region or channel allocation information for uplink data in an uplink subframe linked to the downlink subframe among the plurality of subframes.

12. A data transmission/reception apparatus of a terminal, comprising:
- a communication unit for receiving and transmitting a signal; and
- a controller configured to receive configuration information of a plurality of subframes divided at a time axis in a radio frame, discriminate between a semi-static region and a dynamic region of each of downlink subframes among the subframes, receive a control signal in the semi-static region, and transmit uplink data in the dynamic region if the control signal comprises information indicating the dynamic region is for uplink data transmission, and receive downlink data in the dynamic region, if the control signal comprises information indicating the dynamic region is for downlink data transmission.

13. The data transmission/reception apparatus of claim 12, wherein the controller controls transmitting the uplink data by referencing an uplink reference signal at $5^{th}$ and $11^{th}$ symbols in the dynamic region.

14. The data transmission/reception apparatus of claim 12, wherein the controller controls receiving information on the downlink subframe configured as a Multi-Media Broadcast over a Single Frequency Network (MBSFN) subframe.

15. The data transmission/reception apparatus of claim 12, wherein the control signal comprises channel allocation information for uplink or downlink data in the dynamic region or channel allocation information for uplink data in an uplink subframe linked to the downlink subframe among the plurality of subframes.

* * * * *